June 17, 1958

N. ANTON 2,839,688

RADIATION DETECTOR

Filed Dec. 1, 1955

INVENTOR.
NICHOLAS ANTON
BY Darby + Darby
ATTORNEYS

United States Patent Office 2,839,688
Patented June 17, 1958

2,839,688

RADIATION DETECTOR

Nicholas Anton, Brooklyn, N. Y.

Application December 1, 1955, Serial No. 550,410

5 Claims. (Cl. 250—83.6)

The present invention is directed to the art concerning radiation detectors for providing visual indication of radiation fields and the intensity levels of such fields.

The present invention provides an instrument of simple and portable structure which provides a gross indication of intensity levels of radiation fields by means of glow lamps. By way of example, one glow lamp may commence flashing upon exceeding a first predetermined low intensity level, and a second glow lamp may similarly commence flashing upon exceeding a further predetermined higher intensity level. This is done by an extremely simple circuit and apparatus incorporating self-calibration-checking features.

Other objects and advantages of the present invention will become more fully apparent from consideration of the following detailed description of the preferred embodiment thereof taken in conjunction with the appended drawing in which Fig. 1 is an isometric view of the exterior of the instrument of the present invention;

Figure 3:
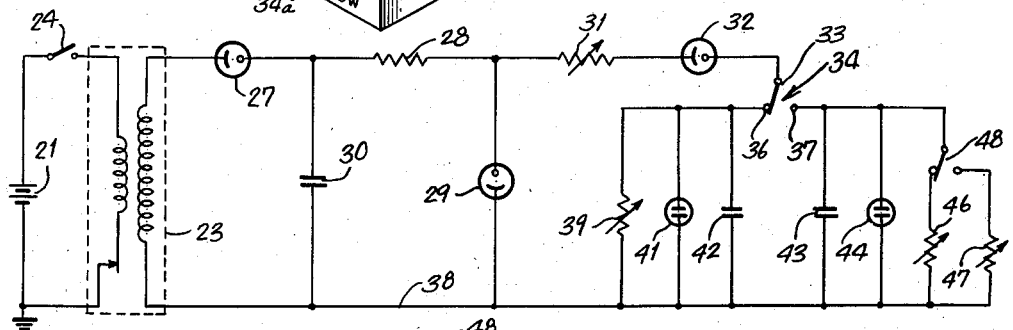
Fig. 3 is a schematic circuit diagram of the instrument.

Referring to the drawings, the instrument of the present invention will be more clearly understood by first considering its circuit diagram, shown in Fig. 3. The source of energy for the instrument is illustrated as a self-contained battery 21, making the instrument readily portable and suitable for field use. The battery 21 is connected to the input of a vibrator 23 through an on-off power switch 24. The pulsating output of the vibrator 23 is connected to a rectifier 27, preferably of the cold-cathode type, in series with which is a resistor 28 and a voltage regulator tube 29. A filter condenser 30 is connected across resistor 28 and regulator tube 29. The voltage appearing across regulator tube 29 is thereby a regulated direct voltage and serves as the power source for the integrator tube circuit, which consists of a resistor 31 in series with a detector tube 32 of the integrator type, such as Anton type 214 tube manufactured by Anton Electronic Laboratories, Inc. The right terminal of integrator tube 32 as seen in Fig. 3, is connected to the movable contact 33 of a single-pole double-throw switch 34 having a pair of fixed contacts 36, 37. Connected between the fixed contact 36 of switch 34 and the common return line 38 is a parallel circuit comprising a resistor 39, a neon glow tube 41, and a condenser 42.

Connected between the other fixed terminal 37 of switch 34 and the common return 38 is a second parallel circuit formed by a condenser 43, in parallel with a neon glow tube 44 and either a variable resistor 46 or a variable resistor 47, according to the position of a further single-pole double-throw switch 48.

The instrument is initially calibrated in the following manner. With switch 36 in the left position as shown in the drawing, the integrator tube 32 is exposed to radiation (such as gamma and/or beta radiation) of a standardized level, such as 5 Roentgens per hour of gamma radiation or beta radiation producing the same effect in tube 32. Such radiation will cause current to flow from the power supply through the integrator tube 32, resistor 31 and into the resistance-capacitance combination formed by resistor 39 and condenser 42 in parallel with glow tube 41. This current is of course dependent upon the radiation field intensity to which the integrator tube 32 is exposed. This current will charge up condenser 42 to a value and at a rate dependent upon the resistance of resistors 39 and 31 and the capacitance of condenser 42. If the voltage across condenser 42 becomes large enough to break down glow tube 41 and cause it to conduct, then condenser 42 will discharge through glow tube 41 until its voltage diminishes to a point where the conduction in the glow tube can no longer be maintained, whereupon tube 41 extinguishes itself and condenser 42 recharges at the same rate as before. This action continues as a cyclic flashing of glow tube 41. With the standard 5 R./hr., field applied, variable resistor 31 is adjusted or selected to have a value in relation to resistor 39 and condenser 42 such that glow tube 41 will just commence flashing.

A second standard radiation source of higher level, say 25 R./hr., is now substituted, and switch 34 is now actuated to the right position, putting glow tube 44, condenser 43 and adjustable resistor 46 in circuit with integrator tube 32. The system will now operate similarly, to cause glow tube 44 to flash. Resistor 46 is now adjusted so that glow tube 44 will just begin to flash at the standard 25 R./hr., level.

With these settings, the instrument is ready for use. Upon exposure of the tube 32 to radiation, current will flow corresponding to the radiation level received by the tube. If the impinging radiation is less than 5 R./hr., neither glow tube will flash, since the integrator tube current is then too small to build up sufficient voltage across the respective condensers. If the radiation level is above 5 R./hr., glow tube 41 will flash, switch 34 normally connecting only this tube 41 in the circuit. The frequency of this flashing of the tube 41 will of course depend upon the rate of charge of condenser 42, which in turn depends upon the radiation intensity to which the integrator tube 32 is exposed. Thus, the flashing of glow tube 41 indicates the presence of more than 5 R./hr., radiation, and the rate of flashing gives a general idea of the amount that radiation exceeds 5 R./hr.

Preferably switch 34 is selected to be a momentary contact switch which normally connects terminals 33 and 36. Hence tube 41 is continuously in circuit under normal conditions and its flashing will indicate a radiation field exceeding 5 R./hr. When this flashing starts, the operator, by depressing the actuating button of switch 34, can determine whether or not the intensity also exceeds 25 R./hr., which will be evidenced by the flashing of tube 44.

The levels of 5 R./hr., and 25 R./hr., were selected merely as illustrative. Preferably, the lower level is selected as such a level where prolonged exposure may injure persons, and hence indication at the lower level will serve as a warning against prolonged exposure. The upper level is preferably selected as a level at which or above which any exposure is dangerous, and will serve to warn personnel to leave the area at once.

Figure 1:
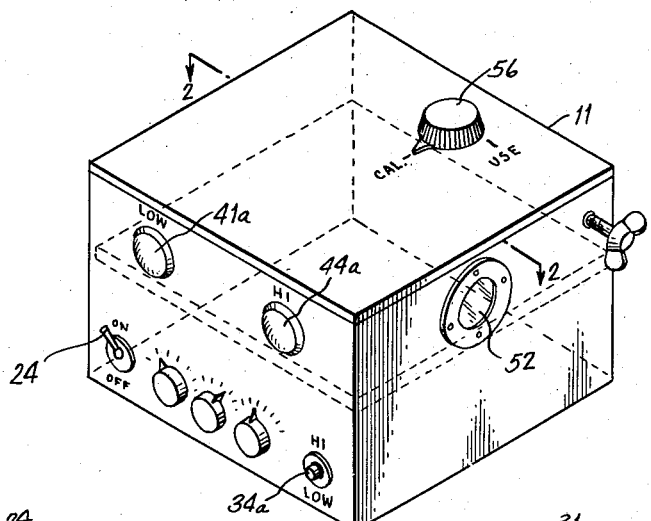
Figure 2:
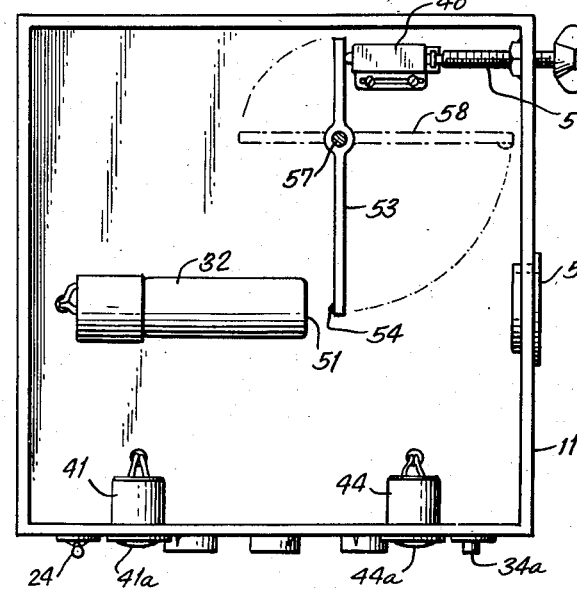
Fig. 2 is a plan view of the instrument of Fig. 1 with the top removed.

For the purpose of providing a self-contained calibration check for this circuit so that it can always be determined to be in proper calibration or can be reset if necessary, an arrangement such as that shown in Figs. 1 and 2 may be used. The entrance window 51 of tube 32 is opposed to an entrance window 52 in the casing 11, so that radiation can enter through casing window 52 and tube window 51 to actuate the integrator tube 32. The remainder of the casing 11 may be made radiationimpervious if desired, or tube 32 may be made receptive to radiation from any direction, in which case casing 11 is made radiation-pervious.

Pivotally mounted within the casing 11 is a lever arm 53 carrying at one end a button 54 which is normally in the dotted line position 58, but in the position shown in solid lines may be located in front of the tube window 51. This button 54 is of radioactive material, suitable for emitting beta rays, and, for example, may be of material including a radioactive isotope of carbon, such as $C_{14}$, having a long radioactive life. The lever arm 53 may be rotated by means of knob 56 extending outwardly of the casing 11 and connected thereto by a shaft 57. Preferably it is normally urged to the dotted line or "normal use" position 58 by suitable means, not shown, such as a spring or the like. Upon rotation of the arm 53 to the full line (or "calibrate") position so that radioactive button 54 is in front of the tube window 51, the tube 32 is subjected to a predetermined radiation intensity, which by adjusting or selecting the button material and the spacing between button 54 and tube window 51, may be made to correspond (so far as the output of tube 32 is concerned) to a gamma radiation intensity of 5 R./hr., at which glow tube 41 will begin to flash. An adjustable mechanical stop, indicated generally at 59, serves to permit button 54 to be set to the proper position to produce the same effect as the effect of 5 R./hr., and thereby provides a radiation field equal to the lower predetermined calibrating field level, in the region of the integrator tube 32 without in any way endangering the operator. This serves as a check upon the operation of the instrument at any time. It is not desirable to enclose in such a portable unit a source which will provide a field of 25 R./hr., thereby enabling a direct check on the higher level indicating circuit. This higher-level circuit is checked by means of switch 48, which as shown in Fig. 2, is preferably in the form of a microswitch carried by the stop 59 and actuated whenever the button 54 is rotated into operative or "calibrate" position. By simultaneously actuating switch 34 and knob 56, adjustable resistor 47 is substituted for resistor 46 in the higher-level indicator circuit. During the initial calibration described above, using the standard 5 R./hr., source, resistor 47 is adjusted so that, upon exposure to a 5 R./hr., source and with switches 34 and 48 actuated (the latter switch 48 is in this instance actuated without swinging button 54 in front of tube 32), resistor 47 is adjusted so that glow tube 44 will just begin to flash. With this adjustment made, then, in the field, upon actuating knob 56 to "calibrate" and also actuating switch 34, glow tube 44 will begin to flash in response to the positioning of button 54 in its correct position before the tube window 51, if the circuit is properly operating. Hence, by the use of the single radioactive button 54, it is possible to check the operation of both glow tube circuits, and assure that the device is in operative condition. This is highly important, since otherwise, if the device were defective, the operator might assume that the radiation was below any danger level when such might not be the fact.

Referring to Figs. 1 and 2, the on-off switch 24 and the momentary contact switch 34 in the form of a pushbutton 34a are shown on the casing 11. The glow tubes 41 and 44 are also mounted on the casing 11, and may be positioned before suitable indicator jewels 41a, 44a. The various resistors 31, 46, 47 may be controlled by knobs 31a, 46a, 47a. If desired, these adjustments might be concealed within the casing 11 to avoid the likelihood of arbitrary mal-adjustment by field personnel after factory adjustment.

As a minor modification of the system of Fig. 3, tube 32 and resistor 31 may be permanently connected to circuit 39—41—42, while a second similar tube and resistor may be permanently connected to circuit 43—44—48—46—47, permitting switch 34 to be omitted. This two-channel system will operate similarly to that described above, with radioactive source 53 either selectively or simultaneously positionable before both such tubes.

Accordingly, the present invention has provided a pair of radioactive level indicators operative at respectively different radiation levels, with self-checking means for assuring proper operativeness during actual use.

It will be understood that the above disclosure is intended to be illustrative only, since many equivalent components or portions of the above system may be used therein, the actual scope of the invention being defined by the appended claims.

What is claimed is:

1. A self-checking radiation-detecting instrument comprising a radiation detector tube, a power supply circuit coupled to said tube, first and second indicator circuits, each of said circuits comprising a glow tube, a resistor and a condenser all in parallel, switch means for selectively connecting either of said indicator circuits to said detector tube, a resistor connected in series with said power supply circuit and said detector tube, said series resistor being adjusted to a resistance value to cause said first indicator circuit glow tube to flash only upon exposure to radiation exceeding a first predetermined level, said second indicator circuit resistor having a resistance value which with said series resistor adjusted value causes said second indicator circuit glow tube to flash only upon exposure of said detector tube to radiation exceeding a second higher predetermined level, a further adjustable resistor having a value which upon exposure of said detector tube to a radiation level exceeding said first predetermined level and upon substitution of said further resistor for said second indicator circuit resistor and upon connection of said second indicator circuit to said detector tube, will cause said second indicator circuit glow tube to flash, a piece of radioactive material, means for selectively positioning said material remote from said detector tube or in a location adjacent to said detector tube at which said material has an effect upon said detector tube substantially the same as that of radiation of said first predetermined level, and means responsive to positioning of said radioactive material in said location for substituting said further resistor for said second indicator circuit resistor, said positioning and substituting means comprising a member carrying said material, means for adjusting the position of said member to position said material adjacent said detector tube and a switch actuatable by said member in a position of said member placing said material adjacent said detector tube.

2. A self-checking radiation-detecting instrument comprising a radiation detector tube, first and second indicator circuits, means selectively connecting either of said indicator circuits to said detector tube, each of said indicator circuits including means for providing an indication only upon exposure of said detector tube to radiation exceeding a respective predetermined level, the levels for two said circuits being respectively a lower level and a higher level and means for checking the operativeness of said circuits, comprising a radioactive material, means for selectively positioning said material remote from said detector tube or in a location adjacent to said detector tube at which said material provides radiation at said lower level, and means responsive to positioning of said radioactive material in said location for causing said higher-level indicating circuit when connected to said detector tube to provide an indication to radiation from said material.

3. A self-checking radiation-detecting instrument comprising a radiation detector tube, a power supply coupled to said tube, a first resistor connected in series with said tube and power circuit, an indicator circuit also connected in series with said tube, said circuit comprising a parallel connection of a glow tube, a resistor, and a condenser, whereby said glow tube will flash only upon exposure of said detector tube to radiation exceeding a predetermined level, and means within said instrument for checking the operativeness of said indicator circuit, comprising a radioactive material, means for selectively positioning said material adjacent to said detector tube to expose said tube to radiation from said material, the radiation from said material having a substantially lower value than said predetermined level, and means responsive to positioning of said radioactive material in said location for modifying the resistance value of said indicator circuit for causing said indicator circuit glow tube to flash in response to radiation from said radioactive material, said last means including a further resistor and switch means responsive to positioning of said radioactive material for substituting said further resistor for said indicator circuit resistor.

4. A self-checking radiation detecting instrument comprising a radiation detector apparatus, an indicator circuit adapted to be coupled to said apparatus for providing an indication only in response to exposure of said apparatus to radiation exceeding a predetermined level, a source of radiation within said instrument, means for selectively positioning said source in a location adjacent to said detector apparatus at which said apparatus will be responsive to said source, said source in said position having a radiation level of a lower order of magnitude than that of said predetermined level, and means for causing said indicator circuit to provide an indication in response to said latter lower level of radiation.

5. An instrument as in claim 4, further including a second indicator circuit adapted to be selectively coupled to said detector apparatus and providing an indication only in response to radiation exceeding a second predetermined level, which level is less than that of said source, whereby said source may be used to check both said indicator circuits.

References Cited in the file of this patent
UNITED STATES PATENTS

| | | |
|---|---|---|
| 2,405,572 | Friedman | Aug. 13, 1946 |
| 2,648,015 | Greenfield | Aug. 4, 1953 |
| 2,666,857 | McLaren et al. | Jan. 19, 1954 |